United States Patent
Kampe et al.

(10) Patent No.: US 10,162,775 B2
(45) Date of Patent: Dec. 25, 2018

(54) SYSTEM AND METHOD FOR EFFICIENT CROSS-CONTROLLER REQUEST HANDLING IN ACTIVE/ACTIVE STORAGE SYSTEMS

(71) Applicant: Futurewei Technologies, Inc., Plano, TX (US)

(72) Inventors: Mark Kampe, Los Angeles, CA (US); Can Chen, Chengdu (CN); Jinshui Liu, Frisco, TX (US); Wei Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 405 days.

(21) Appl. No.: 14/979,264

(22) Filed: Dec. 22, 2015

(65) Prior Publication Data
US 2017/0177520 A1    Jun. 22, 2017

(51) Int. Cl.
*G06F 13/28* (2006.01)
*G06F 13/42* (2006.01)
*G06F 13/16* (2006.01)
*G06F 15/173* (2006.01)
*G06F 13/40* (2006.01)
*G06F 15/17* (2006.01)

(52) U.S. Cl.
CPC .......... *G06F 13/28* (2013.01); *G06F 13/1673* (2013.01); *G06F 13/4022* (2013.01); *G06F 13/4282* (2013.01); *G06F 15/17331* (2013.01)

(58) Field of Classification Search
CPC .. G06F 13/28; G06F 13/1673; G06F 13/4022; G06F 13/4282; G06F 13/17331

USPC .......................................................... 710/308
See application file for complete search history.

(56) References Cited

U.S. PATENT DOCUMENTS

| | | | | |
|---|---|---|---|---|
| 5,642,489 | A * | 6/1997 | Bland | G06F 1/3225 710/22 |
| 5,774,680 | A * | 6/1998 | Wanner | G06F 13/126 710/110 |
| 6,272,582 | B1 * | 8/2001 | Streitenberger | G06F 13/4027 710/314 |
| 6,704,831 | B1 * | 3/2004 | Avery | G06F 13/404 710/310 |
| 6,996,655 | B1 * | 2/2006 | Lee | G06F 13/28 710/22 |
| 7,143,206 | B2 * | 11/2006 | Oda | G06F 3/061 710/22 |

(Continued)

*Primary Examiner* — Christopher B Shin
(74) *Attorney, Agent, or Firm* — Slater Matsil, LLP

(57) ABSTRACT

A system and method for cross-controller data storage operations comprises interconnecting a responding storage controller and an owning storage controller with a direct memory access (DMA) capable fabric, the responding storage controller and the owning storage controller each comprising an interface from a data bus connected to the DMA capable fabric, configuring and implementing a shared DMA address space in accordance with the DMA capable fabric, the shared DMA address space including memory on the responding storage controller and the owning storage controller, the shared DMA address space being one of a symmetric or asymmetric address space, and exposing one or more local buffers of the responding storage controller and one or more local buffers of the owning storage controller through the shared DMA address space.

21 Claims, 10 Drawing Sheets

(56) References Cited

U.S. PATENT DOCUMENTS

| | | | | |
|---|---|---|---|---|
| 8,073,994 B2* | 12/2011 | Roberts | ............... | G06F 13/385 |
| | | | | 709/212 |
| 2002/0078270 A1* | 6/2002 | Hofstee | ............... | G06F 13/28 |
| | | | | 710/23 |
| 2005/0235068 A1* | 10/2005 | Moriki | ............... | G06F 13/28 |
| | | | | 710/5 |
| 2010/0228894 A1* | 9/2010 | Strulovici | ............... | G06F 12/08 |
| | | | | 710/25 |
| 2011/0004732 A1* | 1/2011 | Krakirian | ............... | G06F 12/0817 |
| | | | | 711/147 |
| 2013/0117403 A1* | 5/2013 | Archer | ............... | G06F 15/17318 |
| | | | | 709/212 |
| 2015/0019923 A1* | 1/2015 | Michels | ............... | G06F 15/17331 |
| | | | | 714/718 |

\* cited by examiner

SYSTEM AND METHOD FOR EFFICIENT CROSS-CONTROLLER REQUEST HANDLING IN ACTIVE/ACTIVE STORAGE SYSTEMS

TECHNICAL FIELD

The present invention relates generally to reliable high performance digital storage systems, and in particular embodiments, to techniques and mechanisms for efficient cross-controller request handling in active/active storage systems.

BACKGROUND

A digital storage system typically contains one or more client storage systems and storage controllers. Storage controllers typically include components such as a processor, memory (e.g., dynamic random access memory (DRAM)), a network interface, and one or more secondary storage devices (e.g., disk drives or flash memory). Client devices typically connect through a front-side network, e.g., Ethernet, Fiber Chanel, Infiniband, over which the client devices submit read and write requests. Considerations in digital storage systems include high performance (input/output (I/O) throughput and response time), high reliability (data should not be lost as a result of a single device failure), and robust availability (service should continue despite a single device failure).

Secondary storage devices typically have limited capacity and I/O throughput, and are subject to many modes of failure. Including multiple controllers in a digital storage system can provide higher scalability, storage capacity, and I/O throughput. Multiple storage controllers are often interconnected to mirror data and forward requests. This interconnection is often achieved through a dedicated back-side network.

Multi-controller systems can be designed to be active/stand-by, where a primary controller handles all requests and a secondary controller waits to take over if the primary controller fails. However, this is wasteful. Better performance can be achieved if the system is designed to be active/active, where each controller serves a roughly equal share of the requests. If a controller fails in an active/active system, the surviving controller(s) may divide up and take over the requests that were previously handled by the failed controller.

SUMMARY OF THE INVENTION

Technical advantages are generally achieved, by embodiments of this disclosure which describe a system and method for efficient cross-controller request handling in active/active storage systems.

In accordance with an embodiment, a method for cross-controller data storage operations is provided. The method comprises interconnecting a responding storage controller and an owning storage controller with a direct memory access (DMA) capable fabric, the responding storage controller and the owning storage controller each comprising an interface from a data bus connected to the DMA capable fabric, configuring and implementing a shared DMA address space in accordance with the DMA capable fabric, the shared DMA address space including memory on the responding storage controller and the owning storage controller, the shared DMA address space being one of a symmetric or asymmetric address space, and exposing one or more local buffers of the responding storage controller and one or more local buffers of the owning storage controller through the shared DMA address space.

In accordance with another embodiment, a data storage system is provided. The data storage system comprises a back-side network, a front-side network, a plurality of storage controllers interconnected by the back-side network, each of the plurality of storage controllers comprising memory and a remote memory manager, a global DMA address space, wherein the remote memory manager of each of the plurality of storage controllers is configured to expose the memory of each of the plurality of storage controllers to the global DMA address space, a secondary storage device coupled to at least one of the plurality of storage controllers, and a front-side network interface capable of scatter/gather direct memory access (DMA).

In accordance with another embodiment, a data storage device is provided. The data storage device comprises a responding storage controller, an owning storage controller, a cross-controller DMA capable fabric, a secondary storage device, and a computer-readable storage medium storing a program to be executed, the program including instructions for interconnecting the responding storage controller and the owning storage controller with the cross-controller DMA capable fabric, configuring and implementing a shared DMA address space for the responding storage controller and the owning storage controller, the shared DMA address space being one of a symmetric or asymmetric address space, and exposing one or more local buffers of the responding storage controller and one or more local buffers of the owning storage controller to the shared DMA address space.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
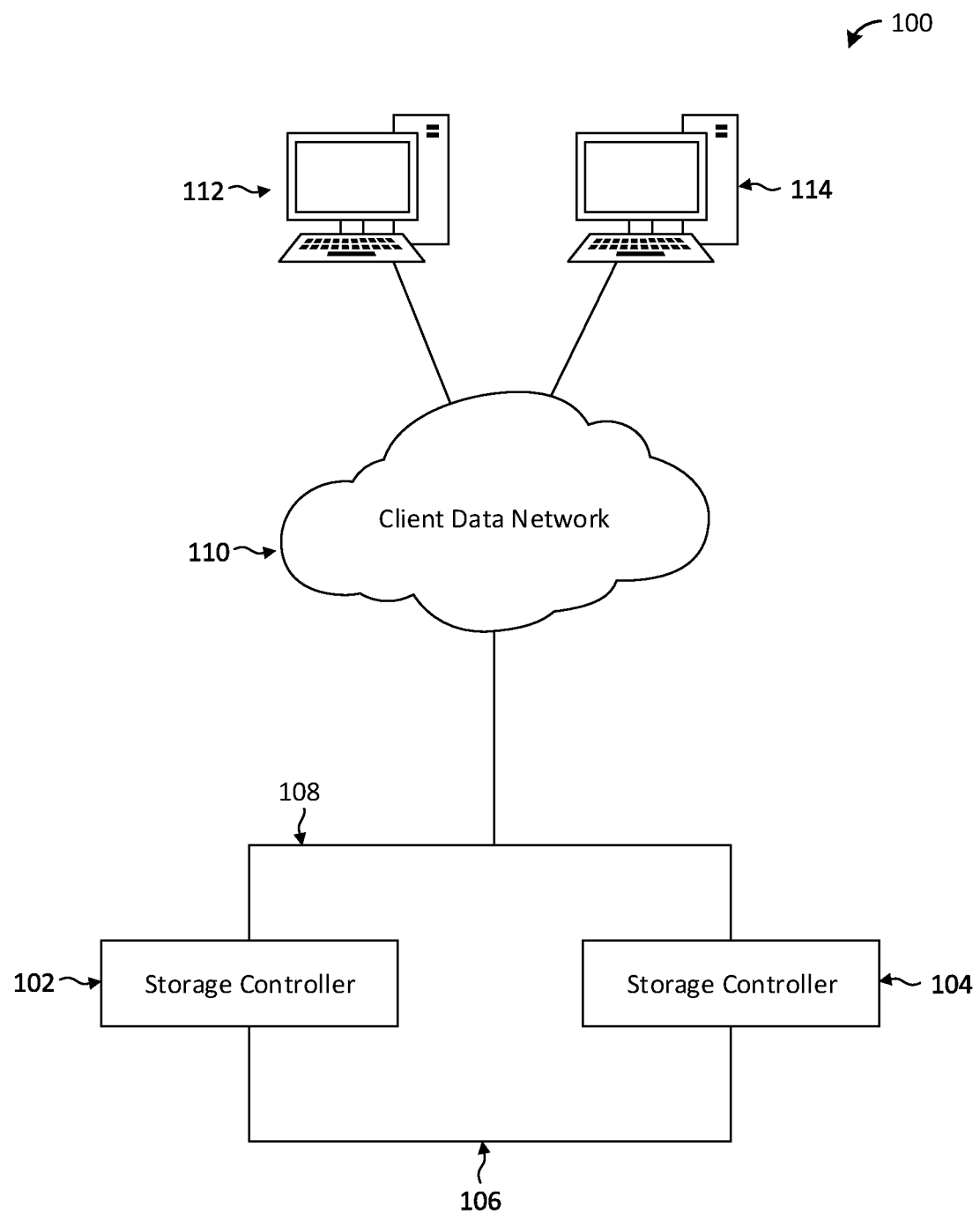
FIG. 1 illustrates an embodiment multi-controller storage system operating in a network.

FIG. 1 illustrates an embodiment multi-controller storage system 100 operating in a network. The multi-controller storage system 100 includes storage controllers 102, 104, a back-side network 106, a front-side network 108, a client data network 110, and clients 112, 114. The storage controllers 102, 104 may be distinct computer systems, or may also be co-located in the same computer system. For example, the storage controllers 102, 104 may include storage area network (SAN) controllers in a data center, or may be disk array controllers in a single computer system. The storage controllers 102, 104 communicate through a back-side network 106. The back-side network may include any communications fabric. For example, the back-side network 106 may include, e.g., a Peripheral Component Interconnect Express (PCIe) bridge, Ethernet, a Fiber Channel (FC) connection, or the like.

The storage controllers 102, 104 communicate with clients 112, 114 over the front-side network 108 and through the client data network 110. The front-side network 108 may include any host bus adaptor or protocol over which client devices may submit read and write requests to the multi-controller storage system 100. For example, the front-side network 108 may be implemented with Ethernet, Fiber Chanel, Infiniband, or the like.

Figure 2A:
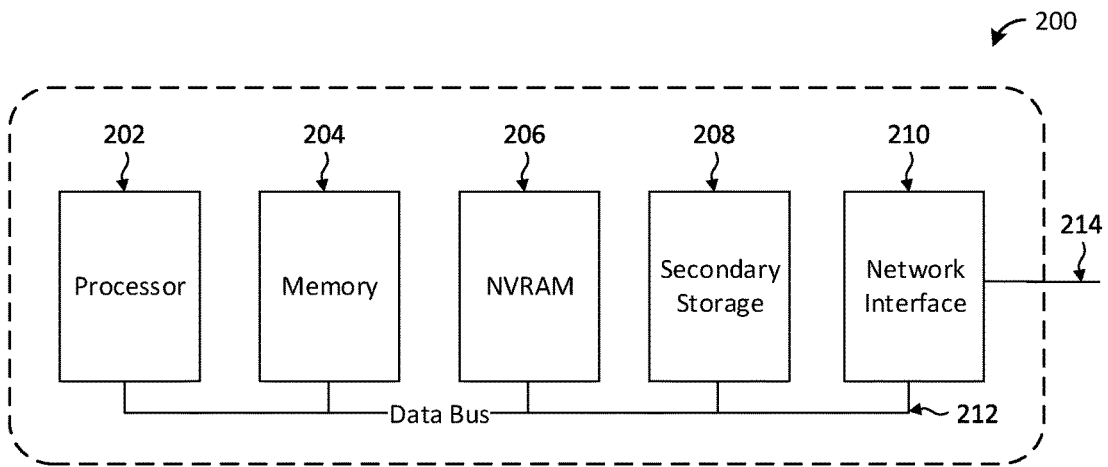
FIG. 2a illustrates a detailed view of a single storage controller.

FIG. 2a illustrates a detailed view of a single storage controller 200. The storage controller 200 includes a processor 202, memory 204, NVRAM 206, secondary storage 208, and a front-side network interface 210. The front-side network interface 210 may be capable of scatter (the ability to deliver different parts of a single incoming stream to multiple receiving buffers) and gather (the ability to construct a single outgoing stream from components in multiple send buffers) DMA. The devices in the storage controller 200 may be interconnected by a data bus 212. The processor 202 and memory 204 may be coupled, or may be separate components or parts of an application-specific integrated circuit (ASIC). The NVRAM 206 may be battery-backed or include other technologies, and is used to buffer writes to the secondary storage 208.

The secondary storage 208 may be a larger storage device than the NVRAM 206. However, the secondary storage 208 may be slower than the NVRAM 206. For example, the NVRAM 206 may be a flash memory array, while the secondary storage 208 may be a magnetic hard disk drive that is much slower than flash memory. As a result, buffering of data writes into the NVRAM 206 may result in much faster write times from the perspective of requesting devices.

A storage controller typically should not acknowledge the successful completion of write operations until the write payload has been safely persisted to secondary storage. Unfortunately processing writes one-at-a-time results in inefficient small I/O transfers, and many secondary storage devices (e.g., rotating and solid state disks) can take a long time to perform a single write. Better throughput can be obtained by accumulating multiple incoming writes into larger transactions. However, this buffering process can further increase the delay before the data can be safely persisted to secondary storage. These problems are typically addressed by buffering the write payloads in non-volatile memory (NVRAM). Write payloads can be copied to NVRAM more quickly than to secondary storage, and copies in NVRAM may survive power failures, software restarts, and non-permanent fatal hardware faults. Data buffered in NVRAM can then be persisted to secondary storage even after failure occurs and the storage controller restarts.

NVRAM is not completely reliable. There are some rare system failures from which it is impossible to recover data that was stored in NVRAM. To protect data from such a failure, storage systems may make several copies of each write payload, and store the copies in distinct failure domains. Distinct failure domains are locations that cannot be affected by a single device failure. For example, a storage system that includes two storage controllers can be designed so that the controllers share no active components, and hence are unlikely to both be affected by any single failure. If a system is designed in this way, adding multiple controllers can simultaneously improve throughput, reliability, and availability.

Figure 2B:
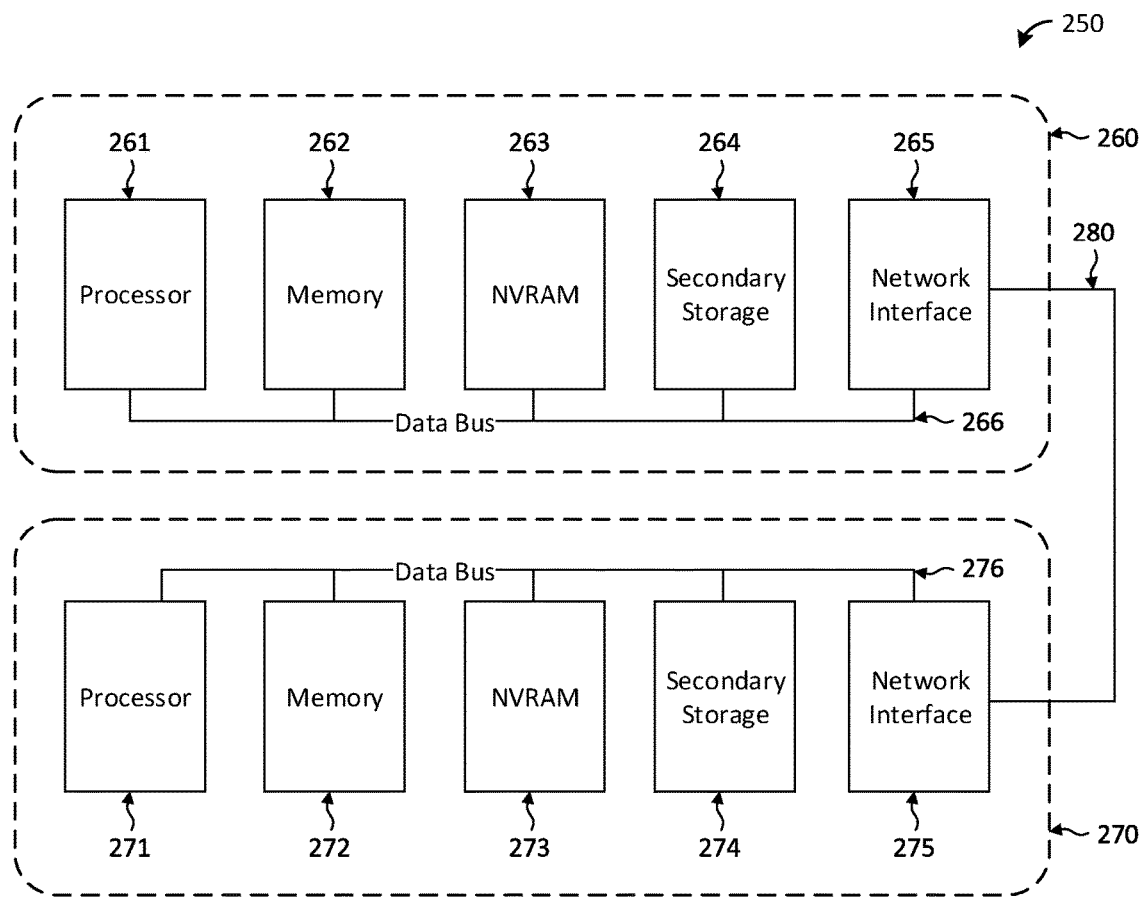
FIG. 2b illustrates a detailed view of a multi-controller storage system where each controller has its own secondary storage.

FIG. 2b illustrates a detailed view of a multi-controller system 250, where each controller has its own storage. The multi-controller system 250 includes controllers 260, 270 interconnected by a dedicated back-side network 280. Each of the controllers 260, 270 may be similar to the storage controller 200 illustrated in FIG. 2a, and include processors 261, 271, memory 262, 272, NVRAM 263, 273, secondary storage 264, 274, and one or more network interfaces 265, 275. The devices in the controllers 260, 270 may be connected by a data bus 266, 276. In some embodiments, the controllers 260 and 270 may be interconnected by a front side network (not illustrated in FIG. 2b), but better performance can be obtained through use of the dedicated back-side network 280 and dedicating the network interfaces 265, 275 to cross-controller traffic. While the controllers 260, 270 are each illustrated in FIG. 2b as having secondary storage 264, 274, it should be appreciated that it is not necessary for each of the controllers 260, 270 to each have their own private secondary storage.

Figure 3:
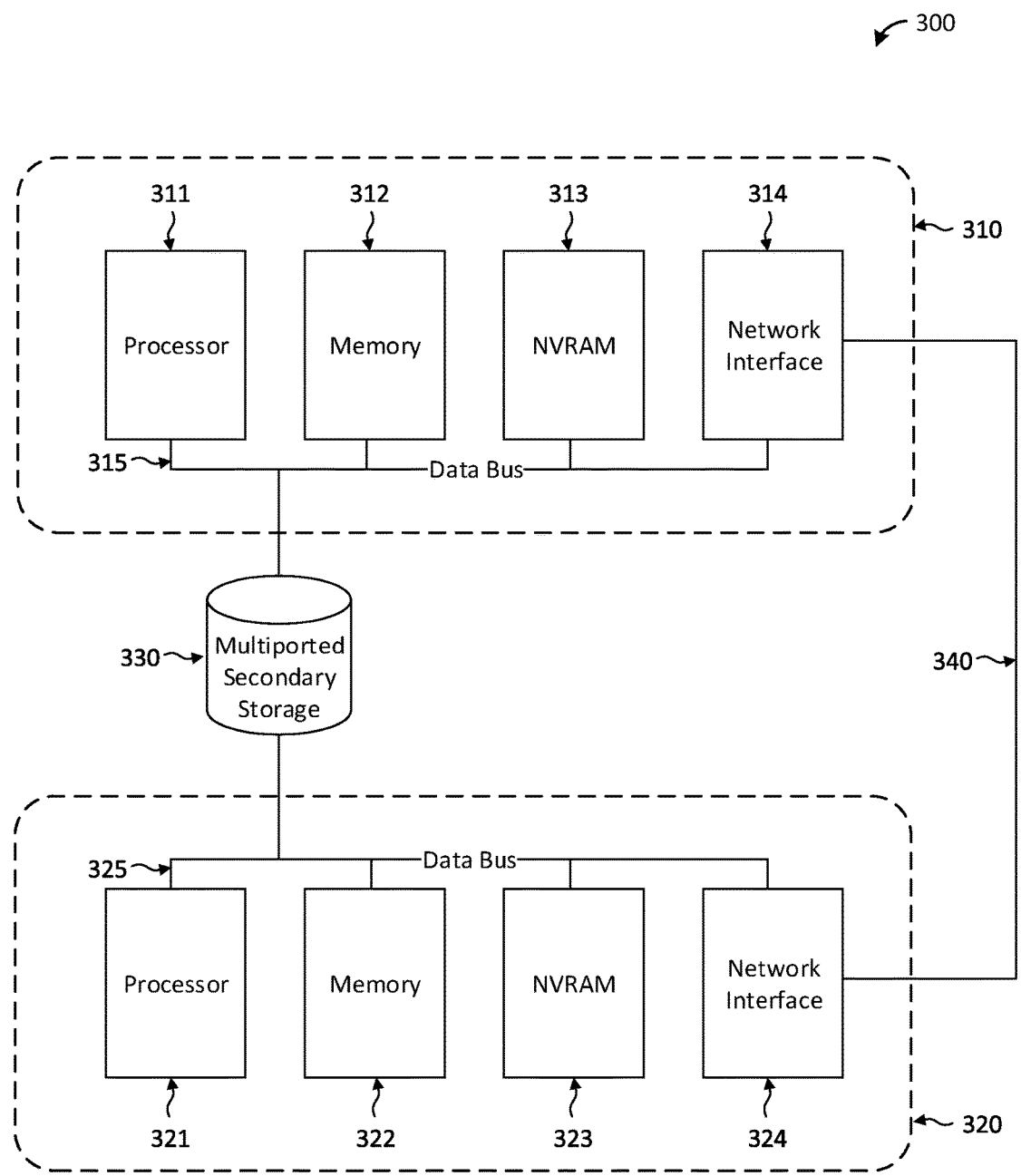
FIG. 3 illustrates a multi-controller storage system where storage controllers share access to a multi-ported secondary storage.

FIG. 3 illustrates a multi-controller storage system 300 where storage controllers 310, 320 share access to a multi-ported secondary storage 330. The storage controllers 310, 320 are interconnected by a dedicated back-side network 340. As seen in FIG. 3, each storage controller 310, 320 includes a processor 311, 321, memory 312, 322, NVRAM 313, 323, a network interface 314, 324, and a data bus 315, 325. In some embodiments, the multi-ported secondary storage 330 may be connected to each storage controller 310, 320 via the controllers' respective data bus 315, 325, such that the multi-ported secondary storage 330 is shared between the storage controllers 310, 320. In some embodiments, the multi-ported secondary storage 330 may be accessible through traditional networks (e.g., Ethernet, Infiniband, etc.) or through storage networks (e.g., Fiber Channel). Note, however, that such shared storage should be either a redundant or highly available device, to prevent it from becoming a single point of failure.

If multiple controllers in an active/active system attempt to update the same device or blocks at the same time, race conditions may result in incorrect updates. Managing such conflicts often requires distributed resource locking which is both complex and time consuming. An alternative to resource locking is to designate each controller as responsible for some subset of logical units (LUNs), file systems, object buckets, blocks, etc. Such a controller may be referred to as an "owning controller" for the resources it is responsible for. If a request is received by an owning controller, that controller can handle the request directly. Many storage protocols include mechanisms to automatically route requests to a particular controller. However, not all protocols provide this ability, and even those that do have situations in which a request can be delivered to the wrong controller. If the request is received by a non-owning controller (referred to as a "responding controller"), it must be forwarded to the owning controller. This process is called proxying, because the responding controller acts as a proxy for the original client when it forwards the request to the owning controller.

Figure 4:
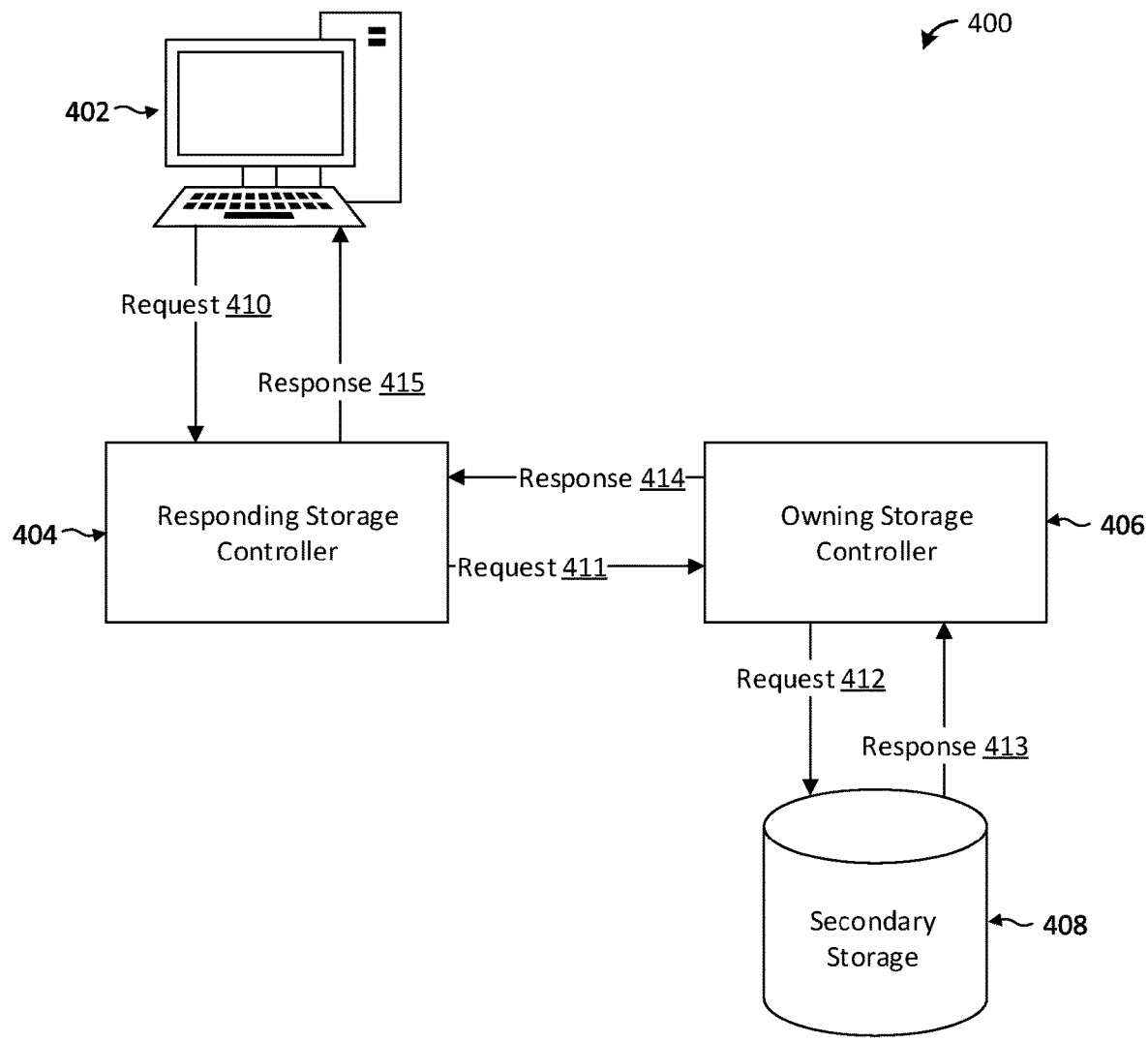
FIG. 4 illustrates data flow in a storage system, showing simple request proxying.

FIG. 4 illustrates data flow in a storage system 400, showing simple request proxying. The storage system 400 includes a client 402, a responding controller 404, an owning controller 406, and secondary storage 408. The secondary storage 408 may be owned by the owning controller 406. For example, the secondary storage 408 may be a solid state or hard disk drive attached to a PCIe bus of the owning controller 406.

The client 402 sends a request 410 to the responding controller 404, which may determine that some or all of the work associated with the request must be done by the owning controller 406. The responding controller 404 forwards the request to the owning controller 406 with a request 411. The owning controller 406 receives the request 411 and performs the requested operation, which may include storage requests 412 and/or storage responses 413 to/from the secondary storage 408. Once the requested operation is complete, the owning controller 406 then sends a response 414 back to the responding controller 404. The responding controller 404 may then send a final response 415 back to the client. While this proxying scheme solves the scheduling and synchronization considerations associated with multiple controllers accessing the secondary storage 408, such proxying is expensive. Sending and receiving messages takes time, consumes network bandwidth, and consumes processing power.

Forwarding of read/write operations may be slow, as the request and response, including the entire data payload must be copied between the responding storage controller and the owning storage controller. Some types of proxying may permit an intermediate storage controller, e.g., an owning controller, to respond directly to requesting client devices.

Figure 5:
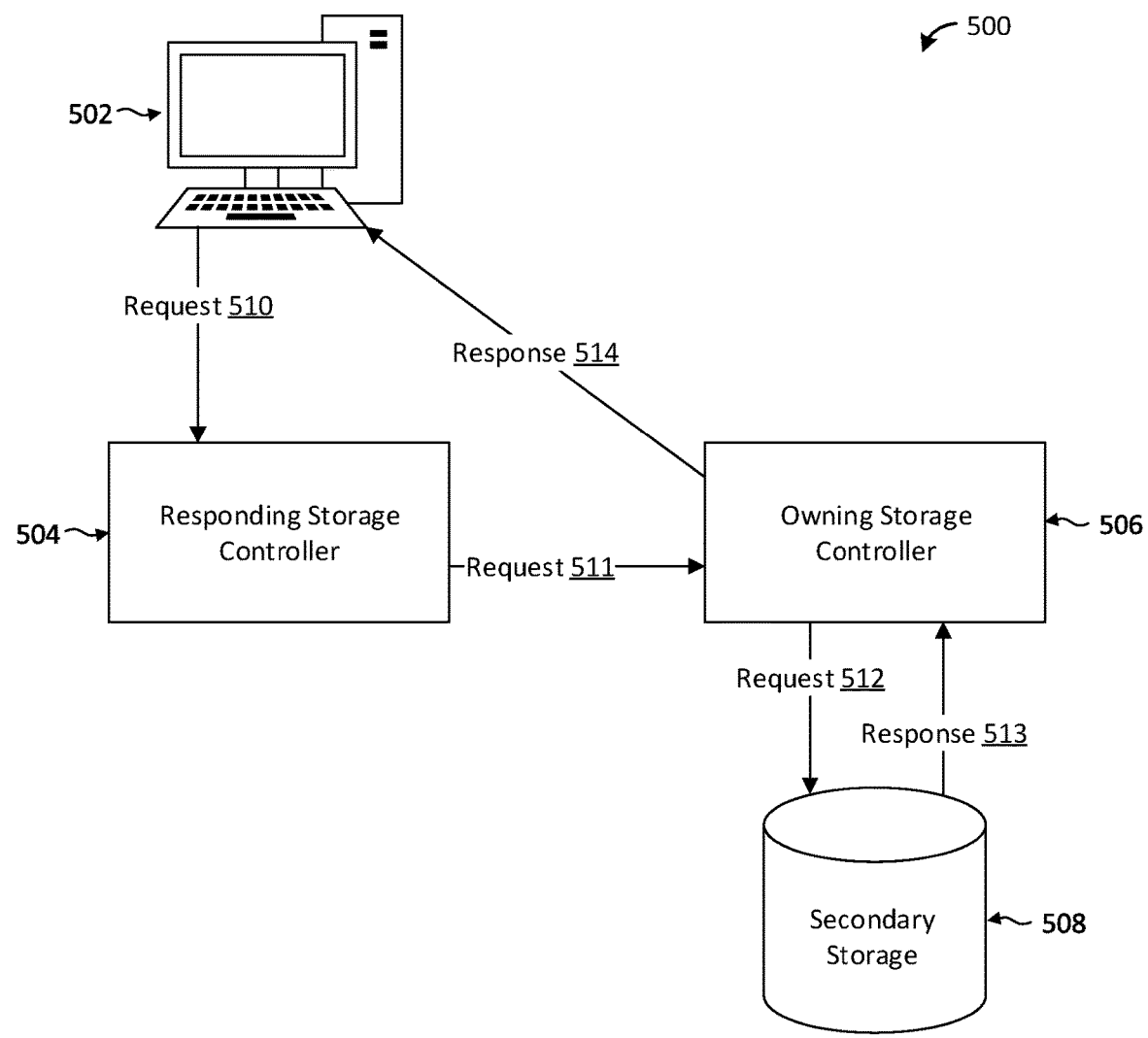
FIG. 5 illustrates triangular data flow for a proxied read request in a multi-controller storage system.

FIG. 5 illustrates triangular data flow for a proxied read request in a multi-controller storage system 500. The multi-controller storage system 500 includes a client 502, a responding controller 504, an owning controller 506, and secondary storage 508. The secondary storage 508 may be owned by the owning controller 506, as discussed above with respect to FIG. 4. On some protocols and networks (e.g. HTTP and Ethernet), the multi-controller storage system 500 attempts to improve the proxying process by eliminating one of the forwarding steps. This may allow the owning controller 506 to respond directly to the client 502. This optimization may be referred to as triangular proxying.

When performing triangular proxying, a request 510 arrives at the responding controller 504, which determines that some or all of the associated work must be done by the owning controller 506. The responding controller 504 then forwards the request to the owning controller 506 with a request 511. The owning controller 506 receives the message and performs the requested operation, which may include storage requests 512 and/or storage responses 513 to/from the secondary storage 508. Once the requested operation is complete, the owning controller 506 then sends a final response 514 directly back to the client 502. Triangular proxying thus eliminates the step of forwarding a final response through the responding controller 504, as discussed above with respect to FIG. 4. Because the final response 514 may comprise a large data payload, performance may be improved by eliminating an extra copy of the payload between the owning controller 506 and the responding controller 504.

Unfortunately, triangular proxying is not possible with all protocols and networks (e.g. Fiber Channel SCSI or iSER over Infiniband). Further, triangular proxying is most effective with a read request, and cannot significantly improve the performance of a write request.

One important difference between storage protocols and other distributed service protocols is that storage requests and responses usually have payloads that are many orders of magnitude larger than the request headers. Thus, even if a client/server remote storage protocol does not allow an owning controller to directly respond to client requests (e.g., requiring some sort of proxying), it may still be possible to achieve significant savings by avoiding transmission of the large data payloads between the responding controller and the owning controller. We have recognized that when a request must be proxied, a responding controller typically does nothing with a payload beyond forwarding it between the client system and the owning controller. Thus, a means of moving data payloads directly between the client and the owning controller (or secondary storage), without requiring a relay through responding storage controllers, may dramatically improve proxying performance. This may be accomplished with the assistance of an inter-controller fabric than enables a controller to perform a DMA operation to a buffer that is located in another controller's memory.

Disclosed herein is a technique for handling cross-controller requests in an active/active multi-controller storage system. Embodiment techniques may allow proxied operations to multiple storage controllers while only requiring one full copy of the payload data. By configuring a global Direct Memory Access space across memories of multiple storage controllers, a request may be forwarded between controllers as normal, except for the payload data, which instead may be transmitted as remote buffer pointer. The sending storage controller may then forward the request and pointer to a receiving storage controller/device. The receiving controller/device may then use the pointer to access the remote buffer through scatter/gather DMA and copy the payload directly from the remote buffer to itself, without requiring a copy to/from intermediate storage controllers. Once DMA copying is complete, a message may be sent to release the remote storage buffers.

Various embodiments may achieve advantages. Direct copying of buffers from the responding storage controller to the owning controller or destination secondary storage may reduce the load on the responding storage controller and/or the owning storage controller. This may reduce the traffic on the front-side and/or back-side networks when reading or writing the request and/or response payloads. Further, memory on the responding storage controllers will not be duplicated and tied up while forwarding an entire buffer payload. Read response latency may also be improved by reducing the amount of time needed to transmit a second copy of the read payload over the network.

Figure 6:
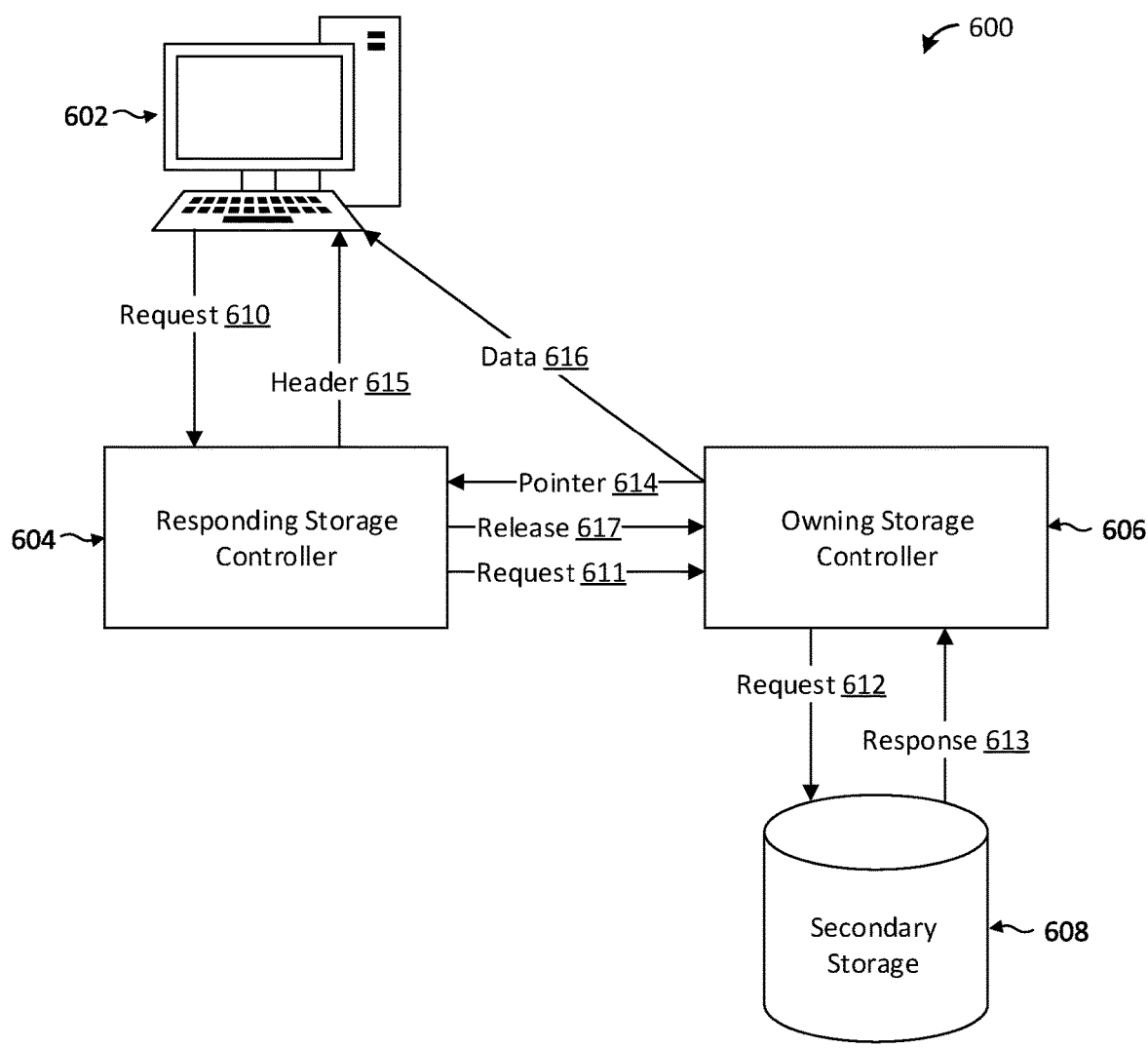
FIG. 6 illustrates a representative data flow for a read operation in an embodiment storage system.

FIG. 6 illustrates a representative data flow for a read operation in an embodiment storage system 600. The storage system 600 includes a client 602, a responding controller 604, an owning controller 606, and secondary storage 608. The secondary storage 608 may be owned by the owning controller 606, as discussed above with respect to FIG. 4.

The responding controller 604 and the owning controller 606 may be interconnected by interfaces that are capable of supporting cross controller DMA requests. Those familiar with the art will realize that such high performance network interfaces for storage protocols often support header/data separation and scatter/gather lists. Header/data separation makes it possible to receive the header for a write request before initiating a DMA transfer of the associated write payload into memory. This, in turn, makes it easier to separate the processing of requests from the processing of the associated data payloads. Gather lists allow a single network protocol message to be gathered from multiple buffers. These mechanisms may thus enable read responses and write payloads to be transferred directly to/from the client 602 and memory in another controller, e.g., the owning controller 606, without having to be buffered in and retransmitted by the responding controller 604.

The client 602 sends a request 610 to the responding controller 604, which may determine that some or all of the associated work must be done by the owning controller 606. The responding controller 604 then forwards the request to the owning controller 606 with a request 611. The owning controller 606 receives the request 611 and performs the requested operation, which may include storage requests 612 and/or storage responses 613 to/from the secondary storage 608. Because the back-side network is capable of cross controller DMA, the owning controller 606 does not have to send the data payload, which can be large, to the responding controller 604. Instead, the owning controller 606 sends the responding controller 604 a response descriptor 614 that points to the location of the desired data, which resides in local memory of the owning controller 606.

The responding controller 604 may then use a DMA gather list to construct a response to the client 602. A response header 615 may be created in the local memory of the responding controller 604 and sent to the client 602. The network interface on the responding controller 604 will fetch the response payload data 616 over the DMA capable back-side network from the owning controller 606, in accordance with the DMA gather list. By directly fetching the response payload from the owning controller 606, the transmission of the payload and rebuffering of the data between the responding controller 604 and the owning controller 606 may be eliminated.

Those familiar with the art will understand that when the response payload data 616 is awaiting transmission to the client 602, data buffers must be pinned in the memory of the owning controller 606 until the transfer has completed. In some embodiments, once the payload data 616 has been sent to the client 602, the responding controller 604 may send a release message 617 back to the owning controller 606, informing it that the transfer has been completed and the associated buffer can be freed. However, the addition of an additional message to the read data path can impact performance. In some embodiments, the completion notifications may be delayed and aggregated into a large batch that is periodically sent to the owning controller 606. The release message 617 may then carry dozens or hundreds of completion notifications. In some embodiments, completion notifications may be delayed and the release message 617 may then be combined with subsequent requests to the owning controller 606. This process may be referred to as "piggybacking." In a heavily loaded system, where new requests are arriving continuously, including the release message 617 with other requests may achieve a similar reduction in message quantity and even less delay than aggregating of release messages.

Figure 7:
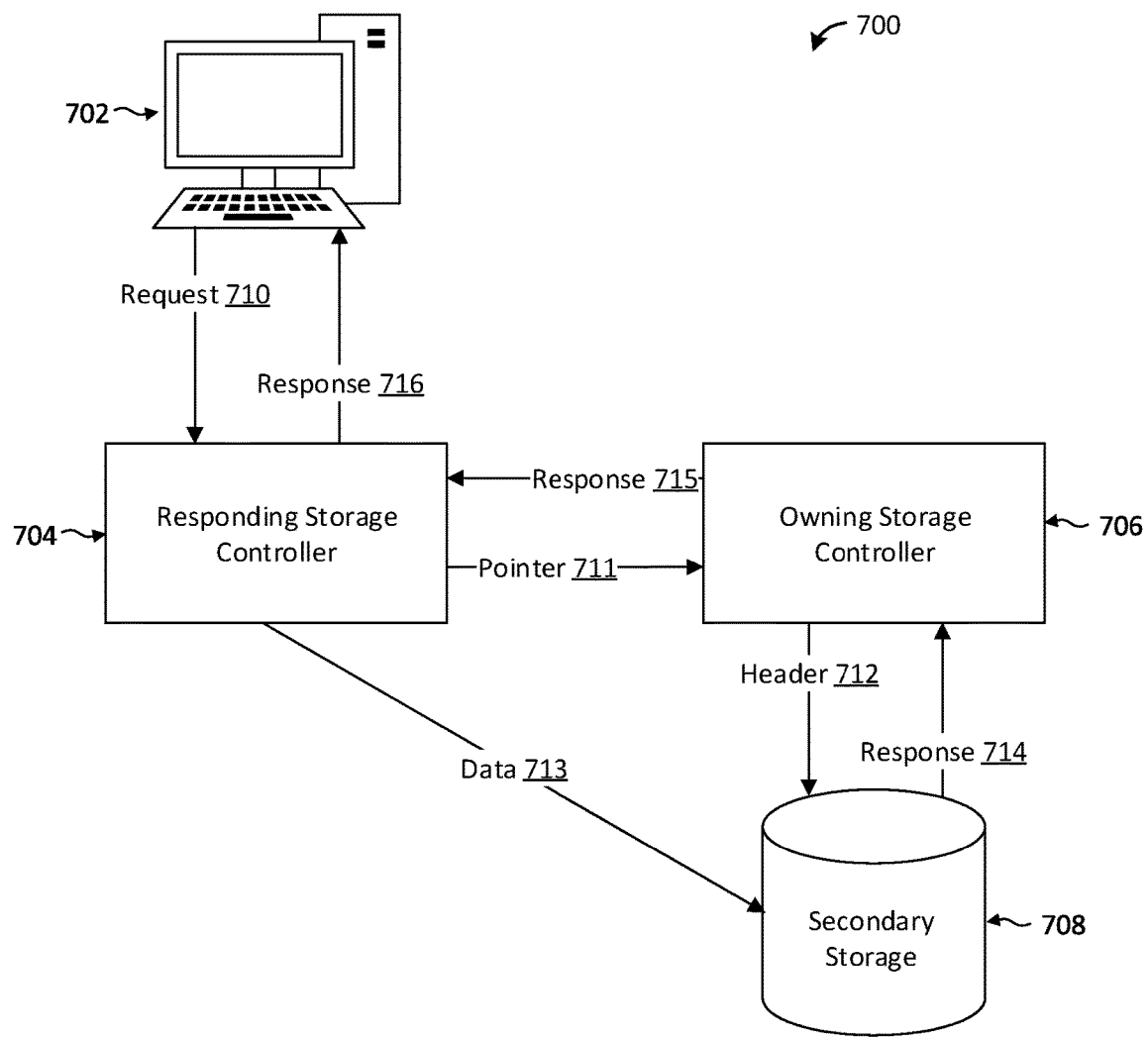
FIG. 7 illustrates a representative data flow for a write request in an embodiment storage system.

FIG. 7 illustrates a representative data flow for a write request in an embodiment storage system 700. The storage system 700 includes a client 702, a responding controller 704, an owning controller 706, and secondary storage 708. The devices in the storage system 700 may be interconnected by a DMA-capable back-side network. The secondary storage 708 may be owned by the owning controller 706, as discussed above with respect to FIG. 4.

The client 702 sends a request 710 to the responding controller 704, which may determine that some or all of the associated work must be done by the owning controller 706. The responding controller 704 forwards the request to the owning controller 706, but it does not send the data payload along with the request. Instead, the responding controller 704 sends a request descriptor 711 that points back to the location of the write payload, which resides in the responding controller 704. When the owning controller 706 needs to copy the payload data to the secondary storage 708 it prepares a DMA request 712, which may include the address of the data in the responding controller 704. The request data 713 may be fetched from the responding controller 704 over the DMA-capable back-side network and written to the secondary storage 708. After this, a storage response 714 may be sent to the owning controller 706, which is forwarded to the responding controller 704 as response 715 and then to the client 702 as response 716. Thus, like the storage system 600 of FIG. 6, the storage system 700 may eliminate the transmission of the payload between the two storage controllers, and the rebuffering of that data in the owning controller 706.

Figure 8:
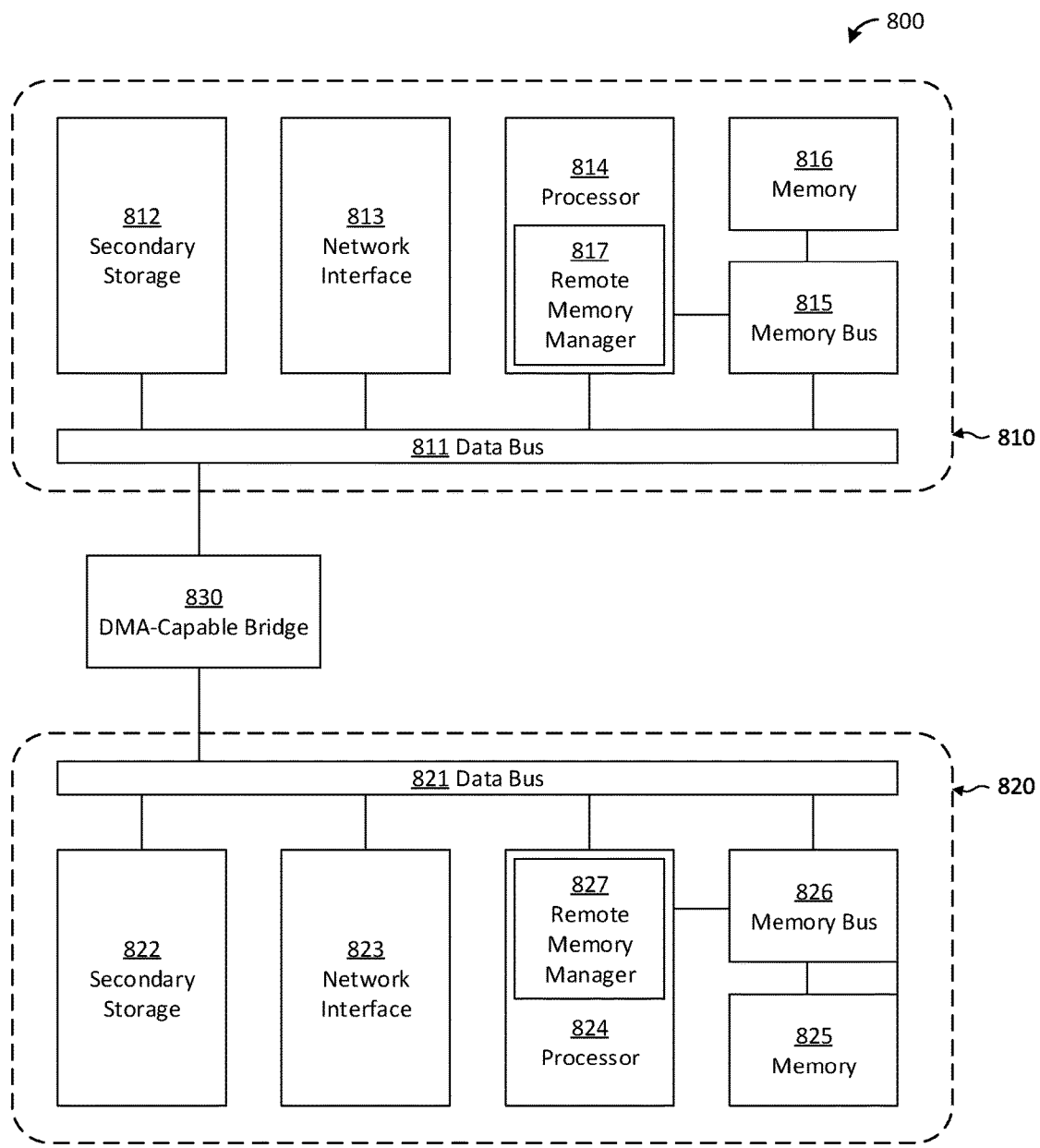
FIG. 8 illustrates an embodiment multi-controller storage system.

FIG. 8 illustrates an embodiment multi-controller storage system 800. The multi-controller storage system 800 may be indicative of a system supporting accessing of remote data with cross-controller DMA operations. The multi-controller storage system 800 includes a first storage controller 810 and a second storage controller 820 interconnected by a DMA-capable bridge 830. The DMA-capable bridge 830 may interconnect the first and second storage controllers 810, 820 through their respective data busses 811, 821. The DMA-capable bridge 830 may be programmed to enable operations occurring on one data bus to access devices or memory on another data bus. For example the processor 814 on data bus 811 of the first storage controller 810 may be able to access the secondary storage 822, the network interface 823, and/or the memory 825 (through the memory bus 826) of the second storage controller 820, through the data bus 821. Cross-controller data transfers, such as the transfers discussed above with respect to the response payload data 616 of FIG. 6 or the request data 713 of FIG. 7, may be accomplished by use of the DMA-capable bridge 830. In some embodiments, the bridge may be programmed symmetrically, to allow each storage controller to access important devices on the other controller's bus in a single global address space. In some embodiments, the bridge may be programmed asymmetrically, such that each controller sees a different address space. In some embodiments, the DMA-capable bridge 830 may comprise a cross-controller fabric capable of DMA, such as a non-transparent PCIe bridge. In some embodiments, the DMA-capable bridge 830 may comprise a cross-controller fabric capable of remote direct memory access (RDMA), such as Infiniband or RDMA-over-Ethernet.

The processors 814, 824 of the first and second storage controllers 810, 820 may each include remote memory managers 817, 827. In some embodiments, the remote memory managers 817, 827 may construct a combined virtual bus address space across the controllers, and program the DMA-capable bridge 830 to implement it. In some embodiments, the remote memory manager 817, 827 may create a global DMA space by mapping remote data references (e.g. the pointers passed in the response descriptor 614 and/or the request descriptor 711) into their corresponding addresses in the combined (symmetric or asymmetric) virtual bus address space, so that cross-controller DMA fetches and stores will access the desired data on the other controller. The remote memory manager 817, 827 may be any device or software module capable of creating a global address space. For example, the remote memory manager 817, 827 may be a software module executed on the processors 814, 824 or on an external support processor (not illustrated in FIG. 8). The network interfaces 813, 823 may be capable of performing scatter/gather DMA requests using the global address space.

Figure 9:
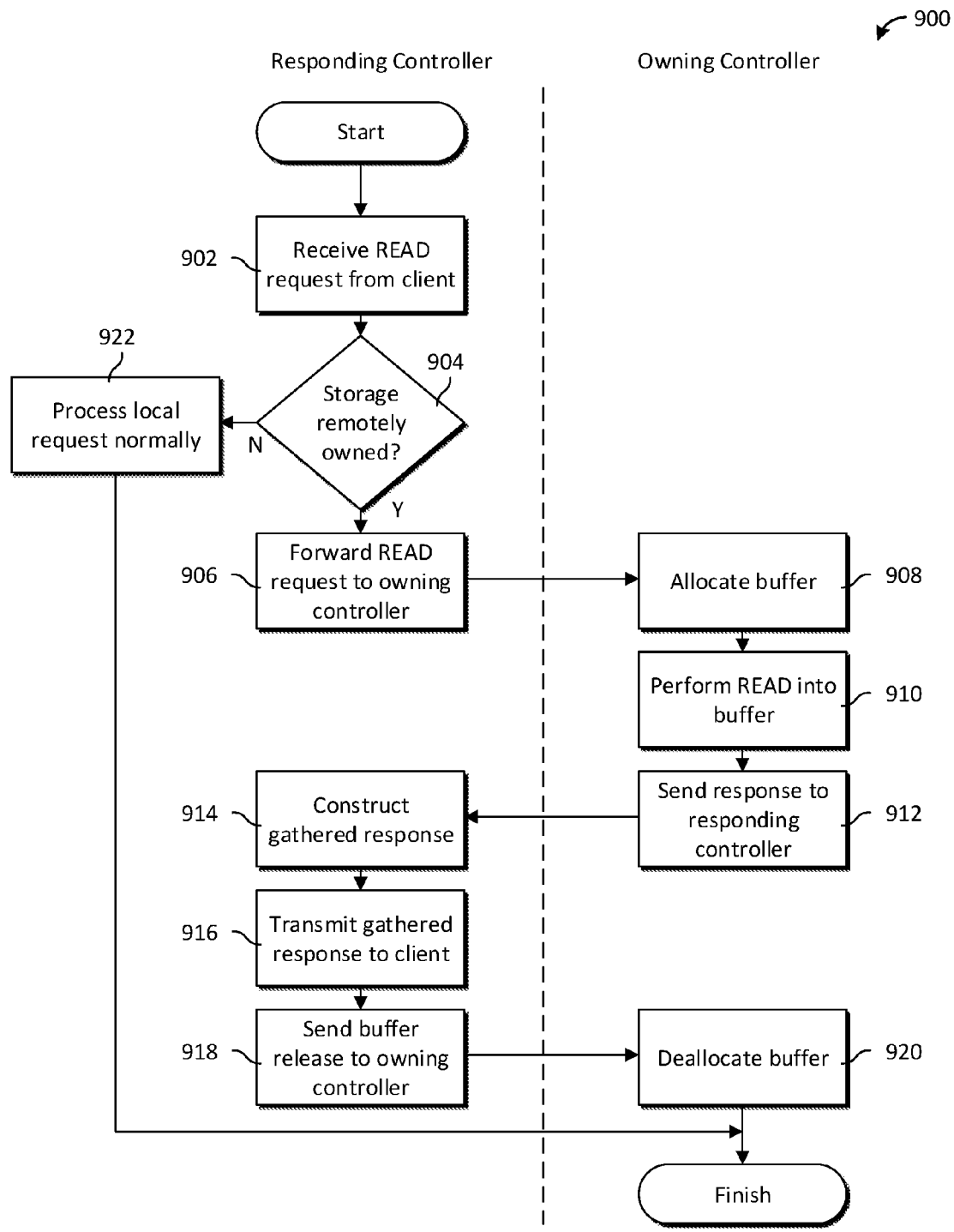
FIG. 9 illustrates an embodiment read method.

FIG. 9 illustrates an embodiment read method 900. The read method 900 may be indicative of operations occurring during a cross-controller DMA read. As shown in FIG. 9, some portions of the read method 900 may occur in a responding controller, while some portions of the read method 900 may occur in an owning controller.

The read method 900 begins in step 902 by receiving and parsing a read request from a client. After receiving the read request, the responding read method 900 continues in step 904 by examining the request to determine whether or not it (or part of it) must be forwarded to another owning controller (e.g., the owning controller 406, 506, 606, 706 of FIGS. 4-7). If the request does not require forwarding to an owning controller, the read method 900 concludes in step 922 by processing the request locally, in the manner performed by traditional storage controllers. If the request must be forwarded, the responding controller forwards the read request to the owning controller in step 906 and awaits a response from the owning controller.

After the owning controller receives a read request that has been forwarded from a client by a responding controller, the read method 900 continues in step 908 by allocating and pinning a buffer in the local memory of the owning controller. After a buffer has been allocated and pinned, the read method 900 continues in step 910 by reading the desired data into the local buffer from a persistent storage device (e.g., the secondary storage 408, 508, 608, 708 of FIGS. 4-7). The read method 900 continues in step 912 by sending a response to the responding controller. The response may include a reference to the local buffer where the data was read from the secondary storage device.

Once the responding controller receives the response from the owning controller, the read method 900 continues in step 914 by constructing a gathered response to send back to the requesting client (e.g., client 402, 502, 602, 702 of FIGS. 4-7), The header for the gathered response may be taken from local memory of the responding controller, but the payload data may be an address or pointer that causes a DMA request to pull the required data payload from a pinned buffer in the owning controller. The read method 900 continues in step 916 by sending the gathered response to the client, including the read payload copied directly from the owning controller. Once the gathered response is sent to the client, a buffer release message is sent to the owning controller in step 918, indicating that the read payload has been successfully transmitted to the client and can be released.

The read method 900 continues in step 920 after the owning controller receives the buffer release message from the responding controller. The owning read method concludes in step 920 by releasing the pinned buffer in response to the buffer release message, so that memory can be recycled.

Figure 10:
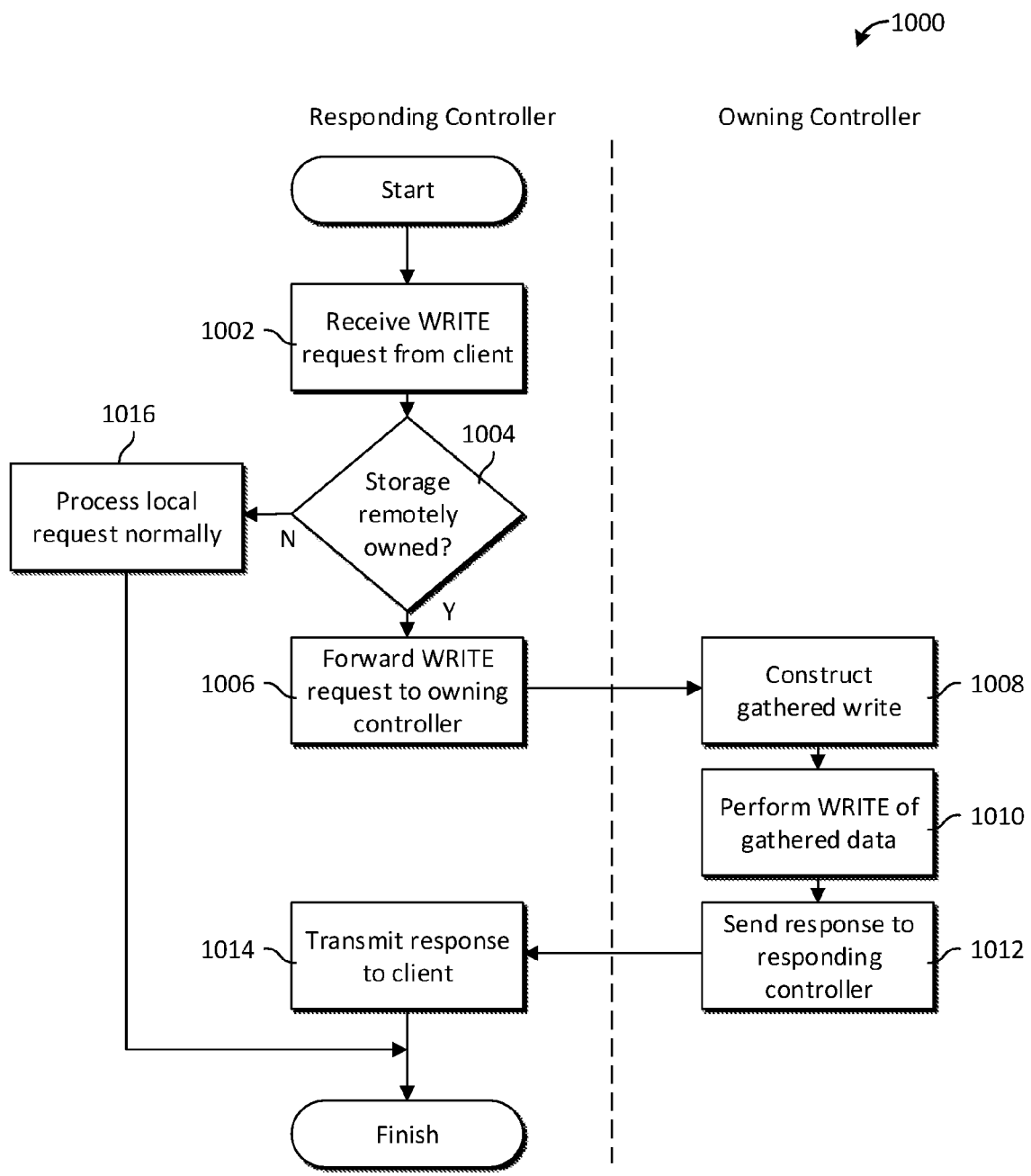
FIG. 10 illustrates an embodiment write method.

FIG. 10 illustrates an embodiment write method 1000. The write method 1000 may be indicative of operations occurring during a cross-controller DMA write. As shown in FIG. 10, some portions of the write method 1000 may occur in a responding controller, while some portions of the write method 1000 may occur in an owning controller.

The write method 1000 begins in step 1002 by receiving and parsing a write request from a client. The payload data of the write request may be buffered in local memory of the responding controller. After receiving the write request, the write method 1000 continues in step 1004 and determines whether or not this request must be serviced by an owning controller (e.g., owning controller 406, 506, 606, 706 of FIGS. 4-7). If the request does not need to be serviced by an owning controller, the write method 1000 concludes in step 1016 by processing the request locally, in the manner performed by traditional storage controllers. If the request must be serviced by an owning controller, the write method 1000 continues in step 1006 by forwarding the write request to the responding controller, and awaiting a response. The write request may include a pointer to local memory of a responding controller where the write payload has been buffered.

Once the write request from the responding controller is received by the owning controller, the write method 1000 continues in step 1008 by constructing a DMA gather operation to write the remotely-buffered data to a persistent storage device (e.g., the secondary storage 408, 508, 608, 708 of FIGS. 4-7). The gather-list address for the payload data may refer back to the responding controller, so that the DMA transfer to the persistent storage device comes directly from the local memory of the responding controller. The write method 1000 continues in step 1010 by performing the constructed gathered write operation to the persistent storage device. As discussed above, the data payload is thus copied directly from the local memory of a responding controller to the persistent storage device. The write method 1000 continues in step 1012 by sending a response to the responding controller, indicating successful completion of the write operation.

Upon receiving the response from the owning controller, confirming a successful write of the payload data to secondary storage, the write method 1000 concludes in step 1014 by forwarding the response to the original client, indicating a successful write operation.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for cross-controller data storage operations comprising:

interconnecting a responding storage controller and an owning storage controller with a direct memory access (DMA) capable fabric, the responding storage controller and the owning storage controller each being connected to the DMA capable fabric;

implementing a shared DMA address space in accordance with the DMA capable fabric, the shared DMA address space including memory on the responding storage controller and the owning storage controller, the shared DMA address space being one of a symmetric or asymmetric address space;

exposing one or more local buffers of the responding storage controller and one or more local buffers of the owning storage controller through the shared DMA address space; and proxying, by the responding storage controller, a data access message between a client and the owning storage controller, the data access message comprising a header and a pointer to a data payload in the shared DMA address space.

2. The method of claim 1, wherein the data access message is a read response, and wherein proxying the data access message comprises:

forwarding, by the responding storage controller, a read request from the client to the owning storage controller; and sending, by the owning storage controller, the read response to the responding storage controller, wherein the data payload in the shared DMA address space is a read payload in the one or more local buffers of the owning storage controller.

3. The method of claim 2, further comprising:

forming, by the responding storage controller, a DMA gather list in accordance with the pointer to the read payload, the DMA gather list drawing the read payload from the one or more local buffers of the owning storage controller; and copying, by a network interface on the responding storage controller, the read payload from the owning storage controller to the client in accordance with the DMA gather list.

4. The method of claim 3, further comprising:

receiving, by the owning storage controller, a release message from the responding storage controller; and releasing the one or more local buffers of the owning storage controller in response to the read payload having been transmitted to the client.

5. The method of claim 1, wherein the data access message is a write request, and wherein proxying the data access message comprises:

forwarding, by the responding storage controller, the write request from the client to the owning storage controller, wherein the data payload in the shared DMA address space is a write payload in the one or more local buffers of the responding storage controller; and sending, by the owning storage controller, a write response to the responding storage controller in response to the write payload having been written to secondary storage.

6. The method of claim 5, further comprising:

forming, by the owning storage controller, a DMA gather list in accordance with the pointer to the write payload, the DMA gather list drawing the write payload from the one or more local buffers of the responding storage controller; and copying, by a storage device interface on the owning storage controller, the write payload from the responding storage controller to the secondary storage in accordance with the DMA gather list.

7. The method of claim 1, wherein the DMA capable fabric comprises a cross-controller DMA fabric.

8. The method of claim 7, wherein the cross-controller DMA fabric comprises a non-transparent Peripheral Component Interconnect Express (PCIe) bridge.

9. The method of claim 7, wherein the cross-controller DMA fabric comprises an Infinband or RDMA-over-Ethernet network.

10. A data storage system comprising:

a back-side network;

a front-side network;

a plurality of storage controllers interconnected by the back-side network, each of the plurality of storage controllers comprising memory and a remote memory manager;

a global direct memory access (DMA) address space, wherein the remote memory manager of each of the plurality of storage controllers is configured to expose the memory of each of the plurality of storage controllers to the global DMA address space;

a secondary storage device coupled to at least one of the plurality of storage controllers; and a front-side network interface capable of scatter/gather direct memory access (DMA), wherein a responding controller of the plurality of storage controllers is configured to proxy a data access message between a client and an owning controller of the plurality of storage controllers, the data access message comprising a header and a pointer to a data payload in the global DMA address space, the owning controller being a different storage controller than the responding controller.

11. The data storage system of claim 10, wherein the data access message is a read response, and wherein the responding controller is configured to forward the read response from the owning controller to the client in response to a read request, wherein the data payload in the global DMA address space is a read payload buffered in the owning controller.

12. The data storage system of claim 11, wherein the responding controller is configured to transfer the read response to the client, wherein transferring the read response to the client comprises forming a DMA gather list that draws the read payload through the global DMA address space from the owning controller.

13. The data storage system of claim 10, wherein the data access message is a write request, and wherein the responding controller is configured to forward the write request from the client to the owning controller in response to the write request, wherein the data payload in the global DMA address space is a write payload buffered in the responding controller.

14. The data storage system of claim 13, wherein the owning controller is configured to transfer the write request to the secondary storage device, wherein transferring the write request to the secondary storage device comprises forming a DMA gather list that draws the write payload through the global DMA address space from the responding controller.

15. The data storage system of claim 10, wherein the back-side network comprises a cross-controller DMA fabric, the cross-controller DMA fabric comprising a Peripheral Component Interconnect Express (PCIe) bus and one or more non-transparent bridges.

16. The data storage system of claim 10, wherein the back-side network comprises a cross-controller DMA fabric, the cross-controller DMA fabric comprising one of an Infinband or RDMA-over-Ethernet network.

17. A data storage device comprising:
a responding storage controller;
an owning storage controller;
a cross-controller direct memory access (DMA) capable fabric;
a secondary storage device; and
a computer-readable storage medium storing a program to be executed, the program including instructions for:
interconnecting the responding storage controller and the owning storage controller with the cross-controller DMA capable fabric;
implementing a shared DMA address space for the responding storage controller and the owning storage controller, the shared DMA address space being one of a symmetric or asymmetric address space;
exposing one or more local buffers of the responding storage controller and one or more local buffers of the owning storage controller to the shared DMA address space; and
proxying a data access message between a client and the owning storage controller, the data access message comprising a header and a pointer to a data payload in the shared DMA address space.

18. The data storage device of claim 17, wherein the cross-controller DMA capable fabric comprises a Peripheral Component Interconnect Express (PCIe) bus and one or more non-transparent bridges.

19. The data storage device of claim 17, wherein the data access message is a write request, and wherein the instructions for proxying the data access message comprise instructions for:

forwarding, by the responding storage controller, the write request from the client to the owning storage controller, wherein the data payload in the shared DMA address space is a write payload in the one or more local buffers of the responding storage controller;
sending, by the owning storage controller, a write response to the responding storage controller; and
sending, by the owning storage controller, the write payload to the secondary storage device with DMA operations that draw the write payload from the one or more local buffers of the responding storage controller in accordance with the pointer.

20. The data storage device of claim 17, wherein the data access message is a read response, and wherein the instructions for proxying the data access message comprise instructions for:
forwarding, by the responding storage controller, a read request from the client to the owning storage controller;
sending, by the owning storage controller, the read response to the responding storage controller, wherein the data payload in the shared DMA address space is a read payload in the one or more local buffers of the owning storage controller; and
sending, by the responding storage controller, a response to the client, the response using a DMA gather list that draws the read payload from the one or more local buffers of the owning storage controller in accordance with the pointer.

21. The data storage device of claim 20, wherein the program further includes instructions for:
sending, by the responding storage controller, a release message, the release message being one of a single, batched, or piggy-backed release message;
receiving, by the owning storage controller, the release message; and
releasing, by the owning storage controller, the one or more local buffers of the owning storage controller in accordance with the release message.

* * * * *